Feb. 18, 1969   F. R. FEDER   3,428,260
SIZE REDUCTION OF HEAT SENSITIVE MATERIAL
Filed Oct. 24, 1966   Sheet _1_ of 2
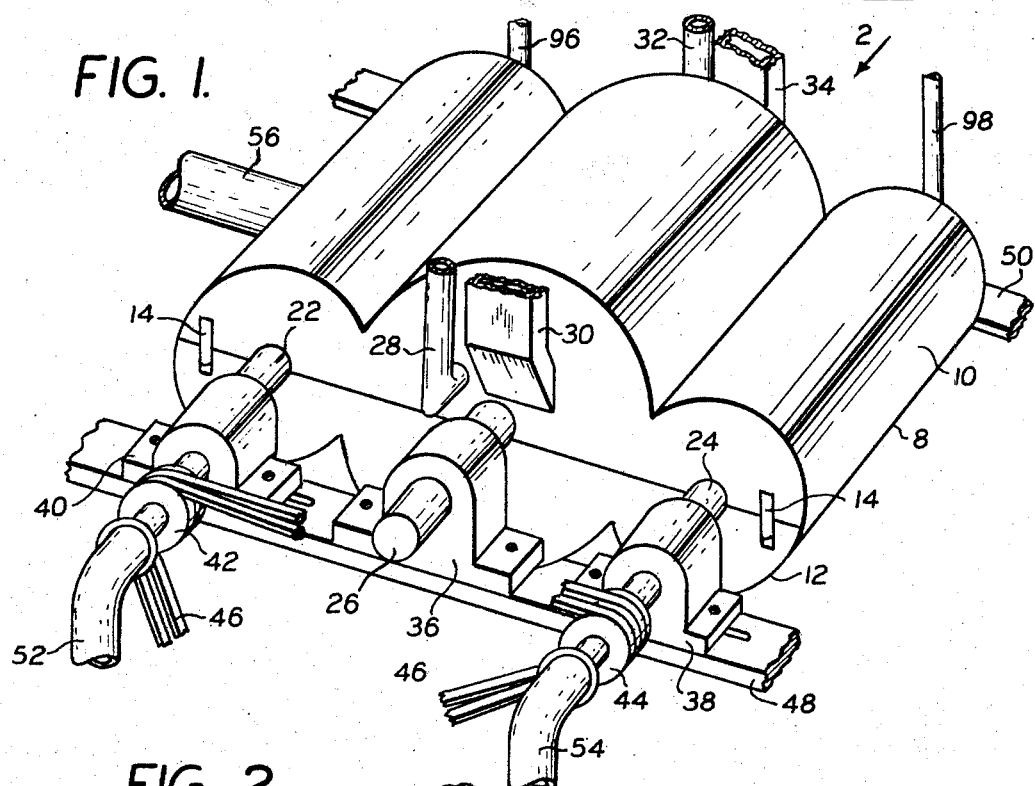
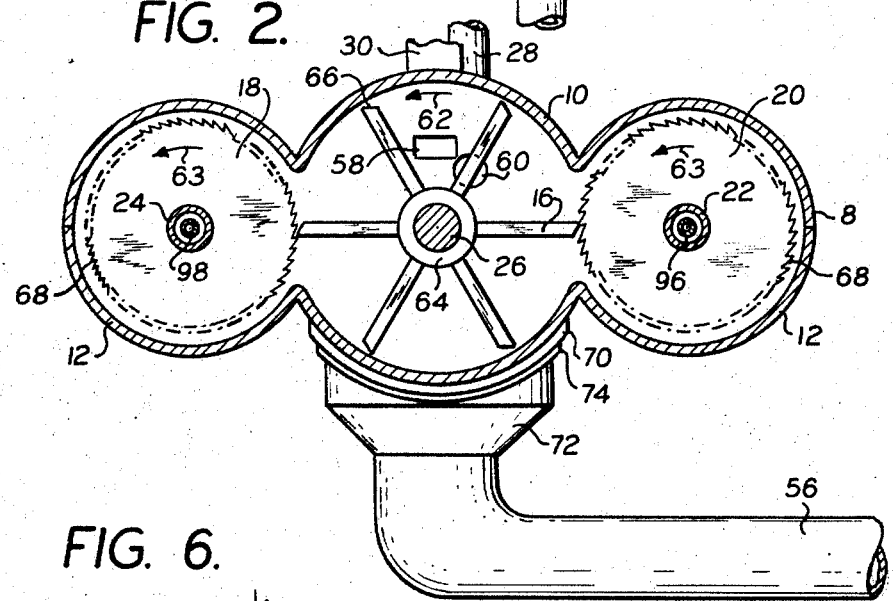
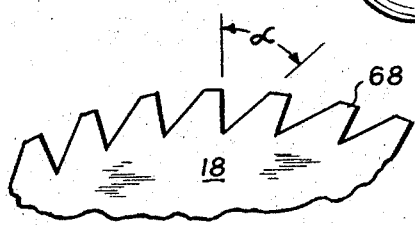
INVENTOR
FRIEDHELM R. FEDER
BY
ATTORNEY

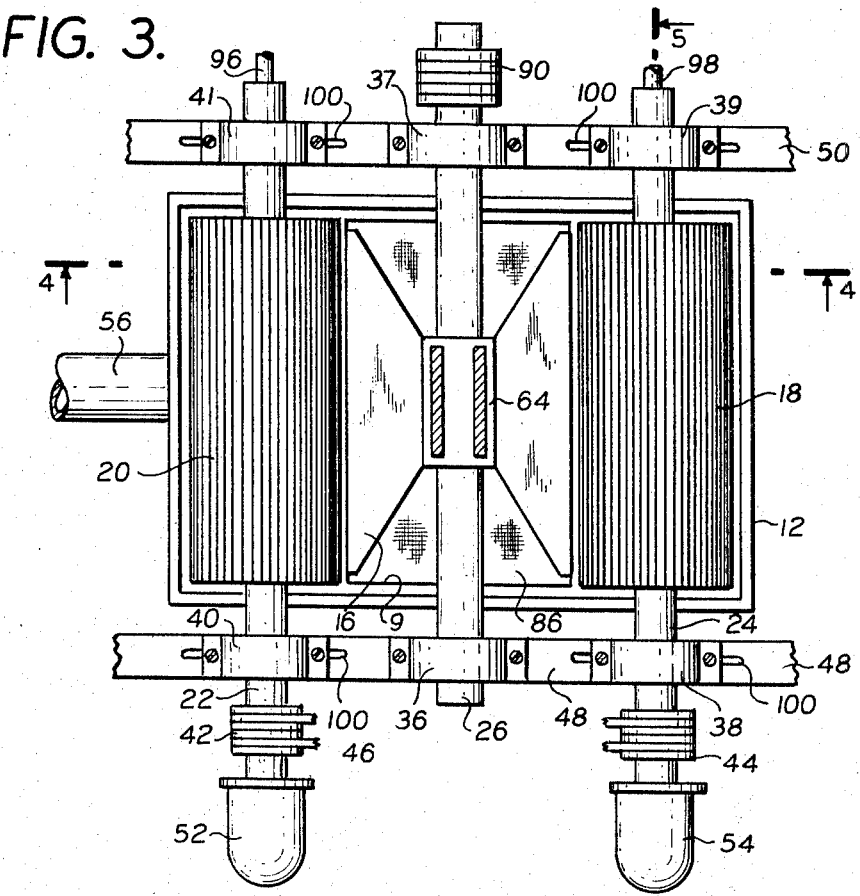
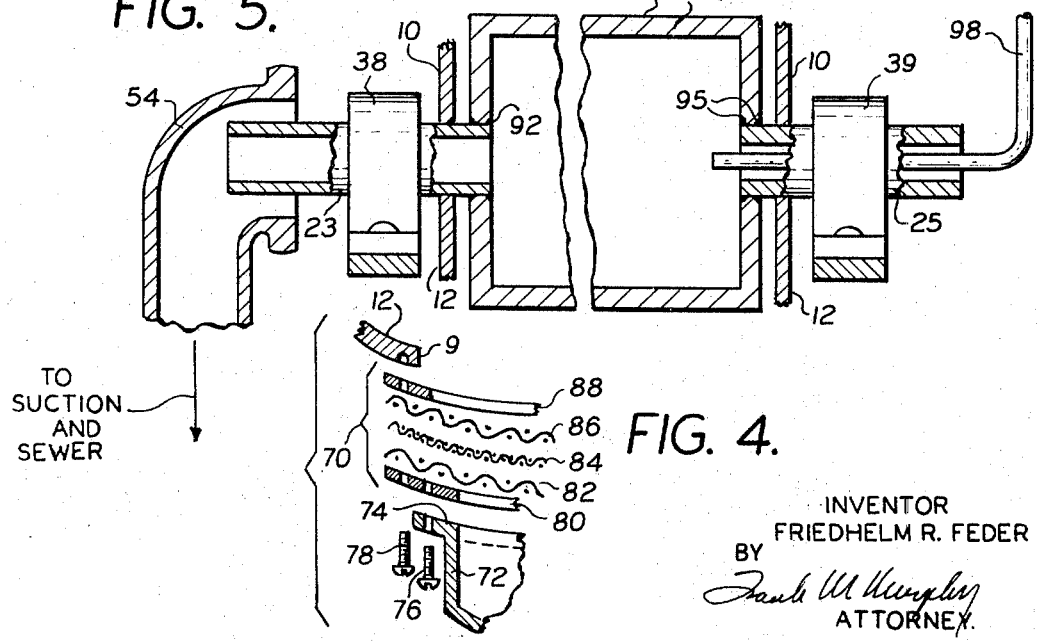

United States Patent Office 3,428,260
Patented Feb. 18, 1969

3,428,260
SIZE REDUCTION OF HEAT SENSITIVE
MATERIAL
Friedhelm R. Feder, North Plainfield, N.J., assignor to
Wedco, Inc., Garwood, N.J.
Filed Oct. 24, 1966, Ser. No. 588,819
U.S. Cl. 241—15                 21 Claims
Int. Cl. B02c 19/06, 21/00, 18/24

The instant invention relates to the size reduction of heat sensitive materials such as thermoplastics, for example polyethylene.

Thermoplastics are produced by the primary producer as pellets of size in the order of ¼″ diameter. In many applications, such as rotational molding, rug backing, it is desired to use the material in much finer condition. Accordingly, various procedures have been employed for size reducing the pellets. A problem is the heat sensitiveness of the material, since in general the size reducing unit operations produce more heat than the material can stand. One solution to the problem was to effect the size reduction in a cold medium, in particular, liquid nitrogen. The resort to such an extreme indicates the seriousness of the problem. Another procedure has been to carry out the reduction in an air stream, relying on the air for cooling. By and large, the approach in utilizing air has been to use equipment of the type, e.g. disc grinders, used for size reduction of wood.

The instant invention utilizes air for cooling, but employs apparatus which, as far as is known, is novel, and is specially designed for the task which is the concern of the invention.

The service requires not only suitable cooling but also the production of a product having good flow properties. The invention meets this requirement.

A significant advantage of the invention is dependability of operation. Thus, in the prior art where, as mentioned above, known size reduction equipment is used, whereas satisfactory operation may be realized for substantial periods, yet at times overheating occurs with the result that the material melts forming a mass within the machine, and necessitating shutdown. This situation has prompted modifications of existing equipment directed to obviating the difficulty. See, for example, U.S. Patent No. 3,302,893 (Ser. No. 345,740, filed Feb. 18, 1964) of the assignee of the instant application. The apparatus of the invention is more dependable in the respect here considered, and indeed can be operated at predermined capacity with less likelihood of occurrence of overheating.

Another advantage of the invention is that the product produced has good flow properties. The flow properties are particularly significant in the use of the fine material. In rotational molding for example, the flowability of the fine material is critical, in production of articles of complicated shapes. The flow properties on the surface character and density of the particles, and the properties, particularly, the surface character are affected by the manner of size reduction and the heating of the particles. No doubt the mere breaking of the particles to size reduce, impairs flowability. Such heating as occurs, on the other hand, would tend to melt the plastic at the surface, and thereby improve flow properties. The flowability of the product of the invention is particularly good and is superior to that generally obtained by reducing with the commonly used disc mills. For many applications, the product can be used directly without a special polishing treatment, as is commonly employed with the product from disc mills. This result is surprising since, according to the invention, the size reduction is effected it seems, by cutting and it would be expected that this would produce a product having surfaces of such character that flowability would be poor.

Still another advantage of the invention is that it commonly permits open circuit operation, whereas, for the same job, prior art procedures would require closed circuit operation. Thus, commonly, the invention eliminates the necessity for classifying and recycling.

A BROAD DESCRIPTION OF THE
METHOD OF THE INVENTION

According to the invention, size reduction of heat-sensitive materials to reduce particles from relatively large size to relatively small size is effected by depositing the large particles in the path of a rotating impeller and impelling the particles outwardly from the impeller path in dispersed condition, and cutting the impelled particles with a cutter disposed with a cutting edge thereof adjacent the the outer periphery of the impeller path. This provides the cut particles in dispersed condition and the cut particles are removed from the vicinity of the impeller and cutter as the small size particles which constitute the product.

Simultaneously with the impelling and cutting of the particles, air is passed into the vicinity of the impeller and cutter for containing the dispersed particles and maintaining the dispersed conditions, and cooling the particles with the air. The air is withdrawn from the vicinity of the impeller and cutter to provide a through flow of air for efficient and effective cooling.

The cutter can be a rotating cutter having cutting edges about its periphery and positioned alongside the impeller. The cutter can then be rotated in the direction of impeller rotation to successively dispose cutting edges as aforesaid. Desirably, a plurality of cutters is used, the cutters being disposed at spaced intervals about the periphery of the impeller. The dispersed conditions can be confined in the vicinity of the impeller and cutters, so that a closed or thorough dispersion of the particles exists therein, and the particles are successively subjected to cutting at different cutters, while being cooled between successive cutting treatments. The air can be pumped thorugh the vicinity of the impeller and cutters by the impeller.

A screen can be disposed at a peripheral portion of the confined vicinity of the impeller and cutters for selectively removing particles from said vicinity, which are below a particle size corresponding to the screen size. The aspect of the invention is particularly significant in open circuit operation since the size reducing procedure of the invention is particularly well suited to such operation, i.e. open circuit processing. The air stream passes through the screen removing particles of the desired small size.

A BROAD DESCRIPTION OF THE APPARATUS
OF THE INVENTION

The apparatus of the invention comprises a rotatably mounted impeller; at least one cutter disposed with a cutting edge thereof adjacent the outer periphery of the path of the impeller for intercepting and cutting the projected particles for the reduction; means for rotating the impeller; a housing for the impeller and cutter for confining the large particles and small particles within the vicinity of the impeller and cutter; and an air inlet to said housing and an air outlet from the housing for communicating the housing with an air source for pumping of air by the impeller through the housing and the particles therein to effect the necessary cooling.

AN EMBODIMENT OF THE INVENTION

The foregoing and other aspects of the invention may be better understood from the following description of an embodiment thereof, depicted in the accompanying drawings, wherein:

FIG. 1 is a perspective view of apparatus according to the invention;

FIG. 2 is an elevation view of the apparatus shown in FIG. 1, looking in the direction of the arrow 2 in FIG. 1, with the adjacent sidewall and elements outwardly thereof removed, so as to reveal the internals of the apparatus;

FIG. 3 is a top plan view of the apparatus shown in FIG. 1 with the upper half 10 of the housing 8 removed;

FIG. 4 is an exploded side elevation view taken along line 4—4 in FIG. 3 and illustrating the screen assembly 70 disposed at the inlet to the product outlet conduit 56 (see FIG. 2);

FIG. 5 is taken along line 5—5 in FIG. 3 and shows the construction and outfitting of the cutter 18 for water cooling thereof; and FIG. 6 illustrates the construction of the cutting edges 68 in the cutter 18.

Referring to the drawing and particularly FIGS. 1, 2 and 3, the apparatus comprises an impeller 16 mounted on a collar 64 (FIG. 2) which in turn is mounted on the rotatable shaft 26. In FIG. 3 the two upper impeller blades have been partially cut away in order to show the form of the blades shown disposed horizontally in FIG. 2. All impeller blades are of the same form (triangular) and this provides an open area adjacent the center portion of the shaft 26 for facilitating feeding of material to the apparatus, as is later described. A wheel 90 (FIG. 3) is mounted on the shaft 26 to accommodate belt driving of the shaft for rotation of the impeller in the direction of the arrow 62 (FIG. 2). The shaft 26 is mounted in journal blocks 36, 37, which are mounted, respectively, on the frame members 48, 50.

Two cutters 18, 20, which are each rotatably mounted rollers positioned alongside the impeller with the axis thereof parallel to the axis of the impeller, are provided for cooperation with the impeller 16. The cutters 18, 20 are of like construction and are mounted respectively on hollow shafts 22, 24. Shaft 22 (FIG. 3) for roller 20 is rotatably mounted in journal blocks 40, 41 and has a drive wheel 42, for belt-driving of the shaft, also mounted thereon. In like manner, shaft 24 is rotatably mounted in journal blocks 38, 39, and is outfitted with drive wheel 44. The cutters are rotated in the same direction as the impeller, as is indicated by the arrows 63 in FIG. 2. The cutters can be rotated by the belt 46 (FIG. 1) from a single motor (not shown).

Each cutter 18 has a plurality of cutting edges extending over the length of the cutter and the rotation of the cutter successively disposes the cutting edges for intercepting and cutting particles impelled by the impeller into the path of the cutting edges. Thus, referring to FIG. 6, the cutter 18 has the cutting edges 68.

The impeller 16 and the cutters 18 and 20 are enclosed by a housing 8 formed of upper half 10 and lower half 12, which halves are secured together by clamps 14. Inlet conduits 30, 34 (FIG. 1) for the material to be size-reduced, communicate with the housing for introduction of material adjacent the center of the impeller. Also air inlets 28, 32 are provided for communicating the center part of the impeller with the atmosphere for pumping of air into the apparatus by the impeller. A muffler (not shown) can be installed in each of the air inlets, to reduce noise level. The inlet 58 for feed inlet conduit 34 and the inlet 60 for air inlet 28 can be seen in FIG. 2.

The apparatus includes a screen disposed at a peripheral portion of the housing 8 for discharge from the housing of particles reduced to a size below a size determined by the screen.

Referring particularly to FIGS. 2, 3, and 4, the lower half 12 of the housing 8 is provided with an outlet opening 9 opposite the impeller 16, this opening being merely a cutout from the housing as is best seen in FIG. 3. Opening 9 communicates with product outlet conduit 56, and size-reduced particles, pneumatically conveyed by air pumped by the impeller, pass through the opening 9 and into conduit 56 for delivery of the finished product.

A screen assembly 70 is disposed in the opening 9 and opposite the impeller 16. See FIG. 4. This assembly includes a sizing screen 84, which is the essential screening element determining particle size of the output, and upper supporting screen 86 and lower supporting screen 82. The supporting screens 86, 82 are coarse relative to the sizing screen 84 and serve as support for the sizing screen. Whether supporting screens are required depends on the fineness of the sizing screen. In the open circuit services for which the apparatus has been found particularly well suited, sizing screens are needed. The screening assembly further includes upper supporting frame 88 and lower supporting frame 80. Screws 78 (FIG. 4) secure the screen assembly together and serve to mount the assembly on the lower half 12 of the housing 8. The product outlet conduit 56 has hopper 72 disposed at its inlet end for communicating the conduit 56 with the screen assembly 70. Screws 76 serve to mount the hopper 72 on the screen assembly.

The construction employing a plurality of cutters disposed alongside the impeller, preferably only two cutters spaced 180° about the periphery of the impeller, is desirable for size-reduction of heat-sensitive materials since this provides spaced working areas about the periphery of the impeller, and the intervening areas or spaces provide cooling zones and thus facilitate the operation so that overheating, agglomeration, etc. is avoided. Also it is desirable that the housing conform to the outline of the impeller and cutter, as in the illustrated embodiment, as this will aid in the maintaining of a cloud or dispersion of the particles in the air, a condition conducive to the needed cooling.

WATER-COOLED CUTTERS

Maintaining of the desired cooling conditions in the apparatus can be aided by water-cooling of the cutters 18, 20. According to the invention, referring particularly to FIG. 5, wherein cutter 18 is shown in cross-section (cutter 20 is of like construction), the cutter comprises a hollow body portion 19, and the shaft 24 is formed of two hollow, rotatably mounted, shaft portions 23, 25. Shaft portions 23, 25 are fixedly joined to the cutter body portion 19 by welds 92, 93, respectively. Shaft portion 23 is mounted in journal 38 and the outer open end thereof communicates with sewer-suction connection 54. The portion 23 serves as a water outlet.

The shaft portion 25 is mounted in journal 39, and non-rotatable water inlet conduit 98 passes through the shaft portion 25 for introduction of water into the body portion 19 of the cutter. Water inlet conduit 98, terminates short of a point within the cutter, adjacent (e.g. with about 2 inches of) the inner end of shaft portion 25. Thus whip of the water inlet conduit 98 is avoided. Water inlet conduit 96 communicates with cutter 20 (FIG. 2).

The inside diameter of shaft portion 25 is less than the inside diameter of the shaft portion 23 and accordingly, during operation, the level of the body of water, which is of cylindrical form, is equal or substantially equal to the radius of the outlet or shaft portion 23, and thus is below the level of the inner wall of the shaft portion 25. Thus during operation, the working water pressure is not applied between the shaft portion 25 and the water inlet conduit 98. Accordingly, it is not necessary to provide a water seal against the working pressure between these elements, and such a seal is not provided. Further, a seal against working water pressure, between sewer connection 54 and shaft portion 23, is not required or provided.

For reasons not understood water issuing from shaft portion 23 tends to reverse its direction and run back along the outer surface of the shaft portion 23 toward the cutter. This difficulty is obviated by applying suction to the conduit 54. This suction also serves to prevent discharge of water through shaft portion 25 upon shutting down of the apparatus. Thus, the invention provides a construction such that seals against working water pressure are not required between relatively rotatable parts and wherein the water enters one side of the roller and leaves via the other side. (Similar constructions, without a seal between rotating parts, are prior art for constructions wherein the water enters and leaves via the same side of the roller; the inlet pipe extends over the length of the roller and whip is a problem.) Elimination of seals and whip of the water inlet is an advantage of the invention.

CONSTRUCTION OF THE CUTTER CUTTING EDGES AND IMPELLER BLADES

The construction of the cutting edges is shown in FIG. 6. For a cutter of 12" outside diameter, there are 240 cutting edges; the angle $\alpha$ is 60° and the cutting edges are provided with a 0.010" ($^{10}/_{1000}$") flat, as a razor edge would not withstand the service. The cutter can be stainless steel. A 12" d. cutter having 240 edges is used for a −12 mesh product; a 12" cutter having 480 edges is used for a −30 mesh product.

Instead of straight edges, the cutting edges can be of spiral form. Also, as an alternative construction, the cutter can be formed of a stack of circular saw blades with the saw teeth providing the cutting elements. This last-mentioned construction, however, is not preferred.

The blades of impeller 16 are formed with beveled ends 66 and the impeller and cutter are closely spaced, e.g. the spacing between centers of a 6" radius cutter and a 9¼" radius impeller is 15¼". Running clearance of about .015" can be provided by adjustment of the journal blocks 38, 39, 40, 41 in the slots 100 (FIG. 3).

SERVICES

The invention is particularly well suited for size-reduction of high and low density polyethylene, polypropylene and other thermoplastic resins, from pellets of ¼"–⅛" diameter to a product about −10 mesh to −30 mesh. The size distribution is narrow, i.e. there are few fines, e.g. in a typical application about 93–96% by weight of the particles will be +60 mesh for a 14 mesh.

The apparatus of the invention can be used for size-reduction of material other than heat-sensitive material, for example thermoset resins (which are not heat-sensitive).

OPERATING EXAMPLE

Apparatus of the construction shown in the drawing having an 18.5" diameter rotor and 12" diameter cutters is used to size-reduce low density polyethylene in an open circuits, from pellets about ⅛" in diameter to small size particles of −30 mesh. The product is well suited for use in rotational molding. The throughput is 150 pounds per hour. (Maximum throughput is determined by overheating of the material treated.) The impeller is driven at 2700 r.p.m. by a 40 H.P. motor and the cutters are driven at 4200 r.p.m. by a single 20 H.P. motor. The clearance between housing and the rotating parts is ¼". Mufflers (not shown) can be installed in the air inlet lines 28, 32 (FIG. 1) to reduce noise level; the product outlet conduit can lead to a cyclone separator disposed 10 feet or so above the mill and the air pumped by the impeller will effect the conveyance.

While the invention has been described with respect to particular embodiments thereof, these embodiments are merely representative and do not serve to define the limits of the invention.

What is claimed is:

1. Process for size reducing heat sensitive plastic particles from a relatively large size to a relatively small size which comprises:
    (a) depositing the large particles in the path of a rotating impeller and impelling the particles with the impeller outwardly from the impeller path in dispersed condition,
    (b) cutting the particles impelled from the path of the impeller with a cutter disposed with a cutting edge thereof adjacent the outer periphery of the impeller path for cutting of particles impelled by the impeller, providing the cut particles in dispersed condition,
    (c) removing cut particles from the vicinity of the impeller and cutter as said small size particles,
    (d) simultaneously with (a), (b) and (c) passing air into the vicinity of the impeller and cutter for containing the dispersed particles and maintaining the dispersed conditions, and cooling the particles, with the air and removing air from the vicinity of the impeller and cutter.

2. Process according to claim 1, wherein the cutting is done with a rotating cutter having cutting edges about its periphery, positioned alongside the impeller, the cutter being rotated in the direction of impeller rotation to successively dispose cutting edges as aforesaid.

3. Process according to claim 2, wherein there are a plurality of said cutters disposed at spaced intervals about the periphery of the impeller, and the dispersed conditions are confined in the vicinity of the impeller and cutters so that a cloud of particles exists therein and the particles are successively subjected to cutting at different cutters, while being cooled between the successive cutting treatments, said air being pumped through the vicinity of impeller and cutters by the impeller.

4. Process according to claim 3, and screening the cloud of particles at a periphery of said confined vicinity for effecting said removal of cut particles.

5. Process according to claim 2, wherein the dispersed conditions are confined in the vicinity of the impeller and cutter so that a cloud of particles exists therein, said air being pumped through the vicinity of the impeller and cutter by the impeller.

6. Process according to claim 5, and screening the cloud of particles at a periphery of said confined vicinity for effecting said removal of cut particles.

7. Process according to claim 6, said size reducing being performed in open circuit.

8. Apparatus for size reduction of material for reducing large size particles to small size particles which comprises:
    (a) a rotatably mounted impeller for projecting particles of the material to be size reduced outwardly of the paths of the impeller,
    (b) at least one cutter disposed with a cutting edge thereof adjacent the outer periphery of the path of the impeller for intercepting and cutting the projected particles to reduce large size particles to small size particles,
    (c) means for rotating the impeller,
    (d) a housing for the impeller and cutter for confining the large particles and the small particles within the vicinity of the impeller and cutter,
    (e) an air inlet to said housing and an air outlet from said housing for communicating said housing with an air source for pumping of air by the impeller through the housing and the particles therein to cool the particles.

9. Apparatus according to claim 8, and a screen disposed at a peripheral portion of said housing for discharge of particles reduced in size to below a size determined by the screen, from the housing.

10. Apparatus according to claim 9, said cutter comprising a rotatably mounted roller positioned alongside the impeller with its axis extending parallel to the axis of the impeller and having a plurality of cutting edges disposed over the length of the roller, and means for rotating the cutter in the direction of rotation of the impeller to successively dispose cutting edges thereof for intercepting and cutting as aforesaid.

11. Apparatus according to claim 10, wherein there are a plurality of said cutters disposed at spaced intervals about the periphery of the impeller.

12. Apparatus according to claim 11, wherein there are only two cutters, the cutters being spaced 180° about the periphery of the impeller.

13. Apparatus according to claim 12, said housing conforming to the form of the impeller and cutters and being closely spaced therefrom to confine the particles in the vicinity of the impeller and cutters for maintaining a cloud of the particles in the housing.

14. Apparatus according to claim 13, said screen being disposed in a portion of said housing opposite the impeller.

15. Apparatus according to claim 14, and an inlet to said housing for introducing large size particles into the housing adjacent the center of the impeller.

16. Apparatus according to claim 10, and means defining a passageway for water through the cutter, and means for supplying water to said passageway, and withdrawing water therefrom.

17. Apparatus according to claim 16, said cutter being hollow for passage of water therethrough, a hollow shaft fixedly joined to each end of the cutter defining an axis for rotation of the cutter, the outer end of one of said shafts communicating with a non-rotatable conduit for connection with a sewer, to serve as a water outlet from the cutter, a non-rotatable water inlet conduit disposed in the opening in the other of said shafts for introduction of water into the cutter, said water inlet conduit being unsealed against working water pressure with respect to the shaft in which it is disposed and terminating short of a point within the roller and adjacent the inner end of the shaft in which the water inlet conduit is disposed, the inside diameter of the shaft in which the water inlet conduit is disposed being less than the inside diameter of the water outlet, whereby the water level in the cutter during rotation of the cutter is radially outwardly of the said diameter of the shaft in which the water inlet conduit is disposed and working water pressure is not applied between the water inlet conduit and the shaft in which it is disposed.

18. Apparatus according to claim 17, the connection between said water outlet and said sewer conduit being unsealed against working water pressure.

19. Apparatus according to claim 17, wherein there are a plurality of said cutters outfitted with water connections as aforesaid.

20. A rotatable water cooled roller comprising
(a) a hollow body portion,
(b) a hollow rotatably mounted shaft fixedly joined to each end of the body portion coaxial with the body portion,
(c) a non-rotatable conduit for connection to a sewer communicating with the outer end of one of said hollow shafts, providing the last-mentioned hollow shaft as a water outlet,
(d) a non-rotatable water inlet conduit disposed in the opening in the other of said hollow shafts for introduction of water into the cutter, said water inlet conduit being unsealed against working water pressure with respect to the shaft in which it is disposed and terminating short of a point within the roller and adjacent the inner end of the shaft in which the water inlet conduit is disposed,
(e) the inside diameter of the shaft in which the water inlet conduit is disposed being less than the inside diameter of the water outlet,
whereby the water level in the cutter during rotation of the cutter is radially outwardly of the said diameter of the shaft in which the water inlet conduit is disposed and working water pressure is not applied between the water inlet conduit and the shaft in which it is disposed.

21. Apparatus according to claim 20, the connection between said water outlet and said sewer conduit being unsealed against working water pressure.

References Cited
UNITED STATES PATENTS

| | | | |
|---|---|---|---|
| 410,247 | 9/1889 | Kimble | 241—47 |
| 2,145,175 | 1/1939 | Hauge | 241—65 X |
| 2,466,443 | 4/1949 | Klaassen | 241—66 |
| 2,471,356 | 5/1949 | Slick | 241—47 |
| 2,959,362 | 11/1960 | Smith | 241—66 |

HARRISON L. HINSON, *Primary Examiner.*

U.S. Cl. X.R.
241—47, 66, 280